(12) United States Patent
Rossiter

(10) Patent No.: US 8,293,115 B2
(45) Date of Patent: Oct. 23, 2012

(54) IONIC IMPURITIES REJECTION AND CHROMATOGRAPHIC PURIFICATION USING ION EXCHANGE

(76) Inventor: Gordon Rossiter, Lakeland, FL (US)

( * ) Notice: Subject to any disclaimer, the term of this patent is extended or adjusted under 35 U.S.C. 154(b) by 0 days.

(21) Appl. No.: 13/337,042

(22) Filed: Dec. 23, 2011

(65) Prior Publication Data

US 2012/0189514 A1   Jul. 26, 2012

Related U.S. Application Data

(63) Continuation-in-part of application No. 13/010,753, filed on Jan. 20, 2011, now abandoned.

(51) Int. Cl.
*B01D 15/08* (2006.01)

(52) U.S. Cl. ..................... 210/656; 210/198.2

(58) Field of Classification Search .................. 210/635, 210/656, 659, 198.2; 423/6, 7, 22
See application file for complete search history.

(56) References Cited

U.S. PATENT DOCUMENTS

| | | | |
|---|---|---|---|
| 4,606,894 A | | 8/1986 | Kunin |
| 5,149,436 A | * | 9/1992 | Taniguchi et al. ............ 210/657 |
| 5,439,591 A | * | 8/1995 | Pliura et al. .................... 210/635 |
| 5,851,400 A | * | 12/1998 | Frey et al. ...................... 210/635 |
| 7,191,797 B2 | | 3/2007 | Jensen |
| 8,153,009 B2 | * | 4/2012 | Gilar et al. ..................... 210/656 |
| 2002/0027104 A1 | * | 3/2002 | Kearney et al. ............... 210/659 |
| 2007/0102363 A1 | * | 5/2007 | Little et al. .................... 210/656 |
| 2007/0125712 A1 | * | 6/2007 | Little et al. .................... 210/656 |

OTHER PUBLICATIONS

Process Development Testing for Continuous Ion Exchange Applications, Gordon J Rossiter, Sep. 2009, Tucson Arizona Conference.
Recovery of Uranium from Carbonate Leach Liquors Using Weak Acid Cation Resins, Cynthia Carmen & Robert Kunin, Reactive Polymers, 4 (1986) 77-89.
"Sorption of Rehium(VII) on Gel and Macroporous Anion Exchangers of Different Basicities from Solutions of Mineral Acids and Their Ammonium Salts", Blokihin et alia, Russian Journal of Applied Chemistry, vol. 78. No. 9, 2005 pp. 1411-1415.

* cited by examiner

*Primary Examiner* — Ernest G Therkorn
(74) *Attorney, Agent, or Firm* — Curtis L. Harrington; Harrington & Harrington

(57) ABSTRACT

The invention covers the combination of utilizing the selectivity of an adsorbent to remove species from a liquid containing mixtures of ions and then subjecting the loaded resin to a chromatographic displacement utilizing the most selectively adsorbed species to displace the undesired co-adsorbing impurities. The technique can be used even when the most selectively adsorbed species is present as a minor constituent in the feed solution.

5 Claims, 2 Drawing Sheets

IONIC IMPURITIES REJECTION AND CHROMATOGRAPHIC PURIFICATION USING ION EXCHANGE

Reference to Related Applications

This application is a continuation-in-part of Ser. No. 13/010,753, filed Jan. 20, 2011, now abandoned.

BACKGROUND OF THE INVENTION

The present invention relates a combination of techniques to produce a high purity metal salt product utilizing the selectivity of an adsorbent to remove species from a liquid containing mixtures of ions and then subjecting the loaded resin to a chromatographic displacement utilizing the most selectively adsorbed species to displace undesired co-adsorbing impurities, and regardless of whether or not the most selectively adsorbed species is present as a minor constituent in the feed solution.

Chromatographic purifications have been used on an analytical scale for many decades. Continuous chromatography has been able to be practiced on a production scale only in several selected industries (e.g., corn syrup industry sugar separations) as well in applications for rare earth separations & purifications.

Techniques for uranium recovery using Weak Acid Cation (WAC) resins is the subject of Robert Kunin's works, including "Recovery of Uranium from Carbonate Leach Liquors Using Weak Acid Cation Resins, Carmen & Robert Kunin, Reactive Polymers, 4 (1986) 77-89 and in a U.S. Pat. No. 4,606,894—"Recovery of Uranium from Carbonate Leach Liquors Using Carboxylic Acid Cation Exchange Resin", which patent is incorporated by reference herein. The ability of these to produce a high quality concentrated product is limited. The Kunin patent reference teaches a cation exchanger to remove uranium cation from solution with the uranium cation simply being later removed from the cation exchanger and further purified to a condition which would enable its return to groundwater.

The Kunin method produces an acidic dilute product from which uranium is either precipitated as a diuranate by adding a base or purified further by anionic exchange. Calcium is removed as well as cationic uranium, and the product uranium concentration will depend upon the amount of Calcium present as well as upon the volume of eluate. Further processing steps are necessary to separate the uranium from the uranium/calcium mix eluted from the resin, as well as from the carbonate and other contaminants such as molybedenum and vanadium. What is needed is a process which takes advantage of components already within an ion exchange system to produce a higher purity product of higher concentration as well as to produce non-product streams which require less processing and are simply recycled within the existing process scheme.

In similar vein, the work by Blokihin et alia, "Sorption of Rehium (VII) on Gel and Macroporous Anion Exchangers of Different Basicities from Solutions of Mineral Acids and Their Ammonium Salts", Russian Journal of Applied Chemistry, Vol. 78. No. 9, 2005 pp. 1411-1415, deals with the selectivity of Weak Base exchangers, Purolite A170 and A172 and a composite exchanger Purolite SIM202 and shows the strong selectivity for rhenium under acidic conditions. What is not evident from the literature is the novel technique, outlined in this invention, for further enhancing the natural selectivity inherent in an adsorbent through combining with this selectivity a chromatographic frontal displacement process to effectively produce a valuable final product consisting of a highly pure solution of a salt of the most selectively held species.

SUMMARY OF THE INVENTION

The invention uses a continuous ion exchange (CIX) system to first remove a species of interest (species A for example), using a suitable resin that exhibits selectivity for this species of interest while simultaneously adsorbing other non-desired species, (B, C, etc, for example); and then which further enhances the resin selectivity to continuously produce a pure product solution of species A by utilizing the product species, A, as a displacing ion in the same CIX system.

The advantages of such a system are enhanced when the input feed is less than optimum, either in being dilute or having a concentration of species A in comparison to other species which is extremely low compared to a mixture of other species present (B & C for example). This input stream may be first treated using a resin that demonstrates a certain selectivity toward the target species (A). As the resin or adsorbent body is contacted with the input stream, it becomes loaded or charged with target species A, but along with some co-loading impurities (B & C for example). Subsequently the resin is processed through a PRE-ELUTION step (countercurrent or co-current) in which the pure species A begins displace all other co-loaded impurities (species B & C for example)from the resin. Once the conditions are optimum for target species A, it is continued to be introduced to the resin for as long as desired to load the resin with the target species A. The amount of target species A loaded onto the resin will depend upon time, the concentration of target species A in the stream introduced to the resin, and the degree of selectivity of target species A with respect to any other species present.

When the target species A either fully saturates onto the resin/absorbent or saturates onto the resin/adsorbent to a desired degree, the resin/adsorbent is made to enter an ELUTION step where species A is desorbed (either a countercurrent or co-current). The eluted product is directed to an elution zone outlet as a high purity, and preferably high concentration eluate or final product solution as desired. The final concentration of species A in solution will depend upon the molarity of the eluent, the degree of adsorbent saturation and the release of waster from the adsorbent during ELUTION. A portion of this final product solution (eluate), now containing normally only the desired species A, may then be re-used (possibly after some storage) to pre-elute the undesired species (species B & C for example)from the resin in the previously mentioned PRE-ELUTION step after the resin/absorbent has been again used in a further main process stream treatment (having the input stream contact the resin/absorbent to become loaded or charged with target species A, along with some co-loading impurities as described above).

The adsorbent after ELUTION is typically rinsed in a RINSE step and may require conditioning with either dilute acid or dilute base. Acid conditioning prevents possible metal hydroxide precipitates from forming in the next ADSORPTION step. Conditioning with base may be required to enhance adsorption of the target species in the next ADSORPTION.

The above technique produces a stream of pure salt product at a strength which depends on the molarity of ELUENT utilized. Further, the co-loaded "impurities" having any significant value can be subsequently purified using a different resin/absorbent in a manner as set forth for the main processing stream. Further, a system may be set up for continuous process flow which will result in a continuous supply of pure product and which can run continuously neglecting any structural breakdown of the resin/absorbent.

It is understood that the number of resin/absorbent beds can be adjusted to give an ever purer product, in addition to the specificity which the resin/absorbent has with respect to the product being produced and purified.

The types of ionic species which can be separated, purified and produced using the invention includes Rhenium and chloride on a weak base anion (WBA), and uranium on a weak acid cation (WAC). In each purification cycle where the pre elution solution further loads the resin/absorbent, the excess portion of this pure eluate (Pre-Eluent), not required in "pre-elution" step may be withdrawn as final product from the process.

The elution step is normally implemented on a weak base anion (WBA) resin using a strong base such as NaOH or is implemented on a weak acid cation (WAC) resin using a strong acid such as HCl. Most WBA resins can also be efficiently regenerated (returned to the free base form) by aqueous ammonia (NH4OH) and consequently any base sufficiently stronger than the basicity of the WBA resin is a suitable eluent for anionic species and any acid sufficiently stronger than the acidity of the WAC resin is a suitable eluent for cationic species. The novelty of this approach includes a number of facts and factors, including the combination of using an adsorbent's or resin's natural selectivity and then using a chromatographic frontal displacement using the most selectively adsorbed target species (A) to reject undesired & co-adsorbed species in the initial ADSORPTION step (such as B & C for example). At its most elegant embodiment, the invention discloses and facilitates combined continuous adsorption with frontal displacement in the same industrial production system, as the subject matter of this application.

To summarize the overall workings of the invention:

1) A strong ionic eluent species (acid (HCl) or base (NaOH)) are used to completely return an absorptive resin to its "free form". In the case of a weak base anion resin (WBA), a strong base (such as, but not limited to NaOH) converts the weak base anion (WBA) resin from its acidic (conjugate acid form) to its free-base form. In the case of a weak acid cation (WAC) a strong acid (such as, but not limited to HCl) converts the weak acid cation (WAC) resin from its basic (conjugate base form) to its acidic form. Although common mineral acids and bases have been used in the examples and illustrations herein, all that may be needed is an acid which is stronger than the resin acid (often simply and typically —COOH as a resin acid), or a base which is stronger then the resin base (often simply and typically a tertiary/secondary base). Note however that if elution with too much base/acid occurs the result might be the production of a target ion product that contains excess eluent and may thus require neutralization.

2) An resin of weaker ionic strength, whether weaker acid or weaker base) than the strength of the eluent. It is precisely the ability of the strong eluent to effectively & efficiently return the resin to its "free form" that makes the process work.

3) A mixture of target and non-target soluble ionic species—all of which are weaker still than the resin ionic strength. For a weak base resin the soluble species are less basic and more acidic than the weak base resin, and for a weak acid resin the soluble species are less acidic and more basic than the weak base resin.

4) a pre-elution step including the introduction of a relatively pure solution of the desired target species is provided to displace the unwanted species off the resin. However, an overfeed of pre-elution pure target ion species may lead to significant loss of target species in the stream of leaving unwanted species.

In general, an expanded discussion of the workings of the process is as follows:

a. After adsorption the resin is in the salt form of several species (e.g., perrhenic acid or HCl amine salt on WBA resins; and, e.g., uranyl carboxlylate salt on a WAC resin). The desired/target species is one of these several species adsorbed. It is in this step that we take advantage of the natural selectivity of the resin.

b. A relatively pure solution of the desired species is provided in the form of a salt ($NaReO_7$ or $NaCl$ or $UO_2Cl_2$ for example only) then pre-elutes the impurities off the resin and replaces the resin sites with the target anion or cation. This occurs due to simple mass action but it is also efficient because the resin selectivity makes the mass transfer go in a thermodynamically favorable direction. The result is a resin with a high-purity concentration of the desired target anion or cation. Then the use of perrhenate, chloride and uranyl are simply specific cases of a general principle.

Generally, Since all processes are imprecise the control system and its monitoring permits us to measure, monitor, and control the exit stream of elution and pre-elution fronts very closely at any number of points along the resin flow length. A zone boundary is observable and/or measurable between zones along the length of the resin. In the case of pre-elution, the incoming target ions produce a zone of pure target ion on the resin apart from a zone of mixed target and non-target ions with a zone boundary in between them. At the beginning of the pre-elution step, this zone boundary is close to the resin inlet or front end of the resin and flow can be high as there are many sites available downstream to perform displacement. However, as this zone boundary drifts forward, the pre-eluent flow can be reduced to give more residence time over a shorter length of resin in the zone of yet to be displaced non-target ion to ensure that waste is reduced, and so that displacement ions have an opportunity to displace the unwanted ions. Such reduction in flow can be obtained automatically and in response to a variety of monitoring techniques.

In the case of elution, the incoming strong ionic eluent species which is used to completely return an absorptive resin to its "free form", produces a zone of un-bound free form resin and a zone of not yet eluted pure target ion on the resin, with a zone boundary between them. At the beginning of the pre-elution step, this zone boundary is close to the inlet or front end of the resin and flow can be high as there are many sites available downstream to perform complete displacement to the "free form" state. However, as this zone boundary drifts forward, the eluent flow can be reduced to give more residence time of eluent and over a shorter length of resin in the zone of yet to be completely displaced target ion to ensure that waste eluent in the leaving target ion stream is reduced, and so that the strong ionic eluent has an opportunity to completely displace target ions with as little eluent as possible to avoid diluting the target ion stream with excess eluent. Such reduction in flow can be obtained automatically and in response to a variety of monitoring techniques including conductivity and/or pH measurements commonly indicate the position or direction of "drift" of these zone boundaries, or fronts.

A generic automated scheme can also be stated in the following outline:

1) A weakly ionic resin (ACID OR BASE) can be used to extract a value (target) species most selectively from many non-target species;
2) The PRODUCT pure solution can be used to PRE-ELUTE the co-adsorbed non-target species; replacing impurities with target species on the resin adsorption sites;
3) a strong ionic solution (ACID OR BASE) can be used to stoichiometrically ELUTE the target species into a PRODUCT solution;
4) the above three operations can then be coordinated and controlled using a controller or CIX system such as the IXSEP-RDA which facilitates & automates the operations shown in FIGS. 1 & 2;
5) The number of target ionic species are many, and only a few specific ones have been utilized in the specific descriptive examples and such examples have included:
  a. Perrhenate ADSORBED from a strongly acidic feed using a WBA (weak base anion) and then ELUTING with a stronger base such as NaOH to produce a PRODUCT $NaReO_7$ solution. An alternative base could be $NH_4OH$.
  b. Chloride removal from a strongly acidic feed using s WBA resin and ELUTING with NaOH to produce a waste NaCl solution. Alternate eluent bases could be KOH or $NH_4OH$. This application is useful in copper electro-winning tank houses where chloride has accumulated to undesirably high levels.
  c. Uranyl oxide cation ADSORBED from a neutral/slightly basic leach solution using a WAC (weak acid cation) or Chelating (aminophosphonic) resin and then ELUTING with a strong mineral acid (e.g., HCl) to produce a PRODUCT solution of Uranyl Chloride. Other suitably strong acids include $HNO_3$, $H_2SO_4$ and others.
  d. In all cases the PRODUCT solution may then be sent to a metal or metal salt recovery operation which could be done by electrolysis, crystallization, chemical precipitation, chemical reduction.

BRIEF DESCRIPTION OF THE DRAWINGS

The invention, its configuration, construction, and operation will be best further described in the following detailed description, taken in conjunction with the accompanying drawings in which.

DETAILED DESCRIPTION OF THE INVENTION

The present apparatus and method can be applied to a variety of extractive industries and focuses upon the main idea of using a displacing pre-elution enrichment in an ion exchange system to produce a product stream of higher concentration, and more particularly of higher purity (such as a pure uranyl salt solution, for example). The preferably continuous ion exchange (CIX) implementation of this invention gives all the further advantages of continuous operation.

The apparatus utilized may have volumes and net material balances in each segment of the operation which may or may not balance and which may involve some net excess output or input and further treatment especially as to the eluent. Further, additional treatment of secondarily valuable species can occur, but will not be shown in the diagrams for purposes of simplicity of the diagram.

Figure 1:
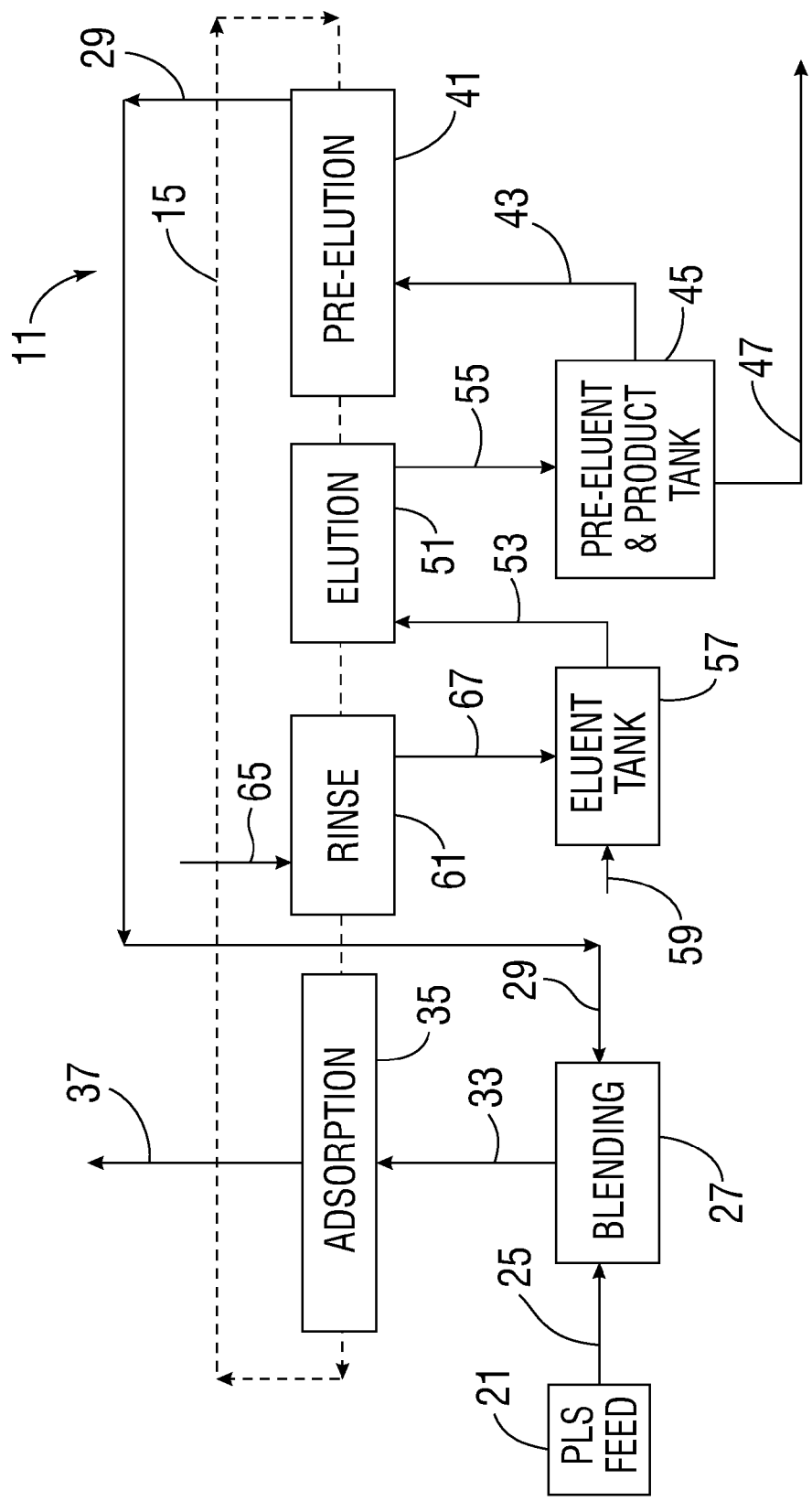
FIG. 1 is a schematic diagram that shows an overall cyclic process for the resin as it traverses the various process zones. It shows the FEED and ADSORPTION, followed by PRE-ELUTION and then ELUTION and RINSE, before the resin/adsorbent is again positioned to adsorb feed as part of a continuous process, and also illustrating the external processes including eluent supply and relationship with the rinse and elution steps, and further illustrating the PRE-ELUENT supply and its relationship with ELUTION and PRE-ELUTION, as well as a product solution take-off, it being understood that other functional zones can be included in the overall cyclic process such as a resin WASH immediately after ADSORPTION and/or a resin CONDITIONING step after RINSE; and, FIG. 2 is a more detailed schematic arranged in terms of resin flow direction and focusing on the ELUTION and PRE-ELUTION and the potential multiplicity of stages with a focus upon the supply eluate product which also serves as a pre-eluant for the impurities.

Referring to FIG. 1, an overall schematic diagram of an ion exchange purification system 11 is shown. The schematic diagram is drawn about a continuous loop shown in dashed line format representing a resin 15 and drawing in a continuous loop shown as a dashed line. In physical realization, a fixed contained volume of resin 15 will be distributed evenly into some multiple number of discrete resin chambers or vessels, the whole comprising a contiguous bed of adsorbent divided into zones of contact and will have a number of different streams introduced to and removed from these various zones of contact, possibly in either of two main directions (upflow or downflow). Taking a fixed volume of resin 15 and sequentially introducing a number of different streams to it can also be thought of as "moving" the resin about a circuit in which it undergoes a number of contact steps.

The resin 15 as it is used over and over in the process to be described, does age by several mechanisms and can be replaced as it becomes less effective. Some of the aging mechanisms are due to osmotic shrinking (when treated with Eluent) and swelling (loaded with species) and this may cause the resin 15, which are typically found to be in a bead shape, to start to break into smaller pieces. As this breaking up occurs, pressure drops through the resin 15 volume increase and eventually the resin 15 will need replacing due to limited hydraulic (flow) capacity. Poisoning of the resin 15 can also occur by resin pores getting blocked and restricting access to ion exchange sites. Usually when a resin capacity for ion exchange reaches <80% of its original capacity it should be replaced. The poisoning can occur due to large molecules getting trapped inside the resin structure and physically blocking the pores and the transport of ions to the adsorptive sites; or, some resins 15 work with ions that cannot be regenerated easily, although this is not usually the case with WAC and WBA resins.

At the lower left side of the FIG. 1, a "pregnant leach solution" or PLS feed block 21 is seen. The PLS feed block 21 can be obtained by any number of methods but may include contacting raw mined ores with a solution which leaches the mineral or metal from the rock in which it was trapped or adsorbed. The PLS feed will contain not only the target species, but also other unwanted species, miscellaneous ions and possibly other contaminants. The PLS feed block 21 should ideally have been processed to the extent possible and efficiently to remove unwanted matter necessary to insure an inlet stream as pure as possible. Starting with a purer stream will simplify the process by eliminating additional components dedicated to either mitigating the effects of contaminants, or increased maintenance from the deleterious effects of contaminants. Elimination of contaminants early on will increase the purity of the product, even if the contaminants have no particular affinity for the adsorption resin.

The PLS feed block 21 may represent a continuous or batch source of dissolved target metal ions. A line 25 supplies the PLS feed to a blending block 27. A recycle line 29 is shown as a second input to the blending block 27. Recycle line 29 may preferably include some of an amount of undesired non-target ions which may have remained on the resin 15 present on the resin after the main adsorption step. Blending block 27 may be a tank, vessel, or a valving system which blends the material from recycle line 29 with the PLS feed through line 25.

An adsorption feed line 33 includes the blended combined stream from the PLS feed 21 and from the recycle line 29. The concentration and other aspects of material in lines 29 and line 25 are preferably not drastically different from each other. A blended adsorption feed line 33 is fed to an ADSORPTION block 35. The ADSORPTION block 35 admits a blended mixture of target ions and non-target ions through adsorption feed line 33 into the ADSORPTION block 35 which may include a vessel or vessels having a volume of the resin 15 through which the blended mixture travels. The ADSORPTION block 35 has a waste line 37 which will ideally contain no target ions, but may and usually will contain non-target ions and other unwanted material. The material of the waste line 37 may be discarded in a responsible manner or may form a feed stream for other processing, possibly including the targeting of the collection and purification of ions that were non-target ions in the ion exchange purification system 11 being explained herein.

It may be that in some circumstances, in order to load the resin 15 fully that some of the target species escapes through waste line 37. This would represent a process loss, but the target species on the resin 15 which then enters the Pre-Elution and Elution steps can still be purified to a resulting high concentration solution. The optimum of course is to load each batch of resin 15 to the maximum/equilibrium level with the target species. In this manner, the amount of eluent (NaOH for Re) per unit of target species recovered in high purity is minimized.

Because the resin 15 is designed to be an optimum absorber for the target ions, the target ions begin to preferentially adsorb onto the resin 15 at the point of earliest introduction. As further blended adsorption feed enters a vessel represented by ADSORPTION block 35, the target ions will preferentially displace some of the non-target ions and begin to flow further downstream within the resin 15 volume where they may adsorb. As blended adsorption feed continues to be introduced the process of non-target ion adsorption followed by non-target ion desorption by preferential target ion adsorption continues.

Viewed along the axis of travel, and if the adsorbed species were visible, the resin 15 near the entry point would have experienced high target ion saturation both due to early target ion adsorption and with target ion displacement of the non-target ions. The volume of the resin 15 nearest the entrance would be seen to be saturated to its equilibrium level with target ions. The next zone would be a continuum between predominantly target ions at the beginning of this zone and continuing to a zone of predominantly non-target ions due to the increasing concentration of the non-target ions due to the preferential adsorbance of target ions. The third zone, if any, will consist of resin 15 which is unadsorbed because it has not yet had a chance to adsorb any species.

As the third zone becomes completely saturated with what has become a high concentration of non-target ions, further non-target ions (especially from upstream preferential displacement from the resin 15 by target ions) will simply pass into the waste line 37 and leave the process. As material from the adsorption feed line 33 continues to flow, target ions continue to displace the non-target ions on the resin 15. If the preference of the target ion for the resin 15 were absolute, the dividing line between a zone of target ions and non-target ions within a volume of the resin 15 would be sharply defined.

In practice, and especially with use in a continuous ion exchange machine, if the target species begins to appear in the Adsorption effluent waste line 37 then the movement of the resin 15 can simply be sped up to offset this effect. If the Flow is simply too high that there is insufficient fluid residence time then there may be a loss of target species due to overloading the kinetic capacity of the adsorption zone of the resin 15. These considerations are easy to fix and plan for in practice. Usually an effective resin 15 adsorption bed length (contact length) is made to be sufficient for the design flow and design target species concentration. The concept that engineers use is the Mass Transfer Zone Length (MTZL) which is characteristic of the actual Fluid Flow, Feed composition, resin kinetics and the MTZL varies as these change. So we usually design for the maximum flow and the maximum feed target species concentration which gives us the maximum MTZL. This is not a claim of this invention but good practice will work within these constraints for the system operation.

However, a number of factors cause definition between the predominant target ion zone and non-target ion zone to be not sharply defined. A few of these factors include the closeness of the degree of affinity for the resin 15 that the target ion expresses versus the degree of affinity for the resin 15 that the non-target ion expresses. Where both have a close affinity for the resin 15, the transition zone within a volume of resin, between the area marking 100% target ion and 100% of the next most adjacent non-target ion will be long. Where the flow rate through the resin 15 is fast, more of the target resin might be swept past sites occupied by the non-target ion for which it would otherwise compete for an adsorption location on the resin under much slower conditions. Flow profile is another factor. In pipes with relatively low flow, the fluid moving nearer a wall moves more slowly than fluid moving in the center of a flow channel.

As a result of all these factors, and many more, it is likely that the transition zone within a volume of resin, between the area marking 100% equilibration of the target ion and 100% equilibration of the next most adjacent non-target ion will be long, uneven, and require practical optimization to insure that the target ion does not "break through" to the waste line 37 and become lost or require much more expensive secondary recovery. The time and extent of saturation that the resin 15 spends in adsorbing target ions, as represented schematically by the step represented by the ADSORPTION block 35 must be considered and adjusted for optimum operation.

Once the adsorption step represented by ADSORPTION block 35, the resin upon which adsorption just occurred is exposed to a pre-elution step, represented by a PRE-ELUTION block 41. Again, it does not matter if the resin 15 physically moves to another location so that it is positioned within another stream, or whether it remains in the same vessel and has its input and output lines changed to accept different inputs and to expel different outputs.

PRE-ELUTION block 41 is shown as having an output as recycle line 29 which was previously discussed. PRE-ELUTION block 41 has an input line 43 which leads away from a block labeled PRE-ELUENT & PRODUCT tank 45 which may be realized in the form of a combined or separate physical storage tanks. PRE-ELUENT & PRODUCT tank 45 may have a product exit line 47 for off loading target ion product either continuously for further processing or in batch lots. The material which flows from PRE-ELUENT & PRODUCT tank 45 through input line 43 is preferably of a high purity and preferably has no non-target ions or has the lowest concentration of non-target ions given any practical limitations of the physical embodiment of the ion exchange purification system 11.

The pre-elution step represented by the PRE-ELUTION block 41 is similar to the action which occurred in the ADSORPTION block 35. Target ions are introduced in an attempt to completely displace any of the non-target ions which may still be present in the resin 15. However, inasmuch as the output of the PRE-ELUTION block 41 leads back through the recycle line 29 to re-enter the blending block 27 where it mixes with the PLS feed source represented by the PLS feed block 21 flowing through line 25, any target ion which managed to make its way out of the PRE-ELUTION block 41 will simply be re-introduced back into the ion exchange purification system 11 and given an opportunity to be re-adsorbed. Because the block representation of the ion exchange purification system 11 is general it can only be said that it is preferable to have the resin 15 reaching the PRE-ELUTION block 41 to have as little of the non-target ion as is practically possible. However, the percentage of the non-target ion which is present will depend upon the operation of the ADSORPTION block 35 which is preferably done to avoid wasting the target ion through the waste line 37. Where the resin 15 has as little of the non-target ion as is practically possible, the high purity material which flows from PRE-ELUENT & PRODUCT tank 45 will be minimized.

Once the further adsorption step represented by PRE-ELUTION block 41 is completed, preferably the complete volume of resin 15 having undergone pre-elution will now be completely loaded with target ion. Any non-target ion, as well as any "bleed-through" target ion is returned to blending block 27 during the pre-elution step. The resin 15 is now ready for the elution step as represented by movement along the dashed line to the ELUTION BLOCK 51. Like each step along the dashed line path through which the resin passes, the elution step involves an input line 53 and an exit line 55. Exit line 55 carries product, a portion of which will also be used as pre-eluent, and is connected to the PRE-ELUENT & PRODUCT tank 45. Input line 53 may be connected to an eluent tank 57 which holds the eluent chemical used in the elution step as represented by ELUTION BLOCK 51. Optionally, the eluent tank 57 may have an eluent supply line 59 from another location, such as a metered flow line or a line accessible by personnel responsible for the operation of the ion exchange purification system 11.

The elution process represented by the ELUTION BLOCK 51 involves subjecting the resin 15 to a changed chemical environment to cause the target ions to no longer be bound by the resin 15. Where the resin 15 is held in a vessel or tube and where the resin 15 is loaded 100% with the target ion, the elution can occur from either end, but it may be preferable to always introduce material from one end. The elution step should continue until all of the target ion is removed from the resin 15 being processed.

Once the elution step represented by ELUTION block 51 is completed, and preferably after the complete volume of resin 15 undergoing pre-elution will be effectively depleted of any target ion, it is necessary for the resin 15 to be returned to a state in which the adsorption cycle may again occur. This can be accomplished by first rinsing the resin 15 in a RINSE zone 61 and then by equilibrating the resin 15 with the barren solution from stream 37 or a specially prepared conditioning solution. As is the case for each step along the dashed line path through which the resin passes, the rinse step involves a rinse water input line 65 and a rinse exit line 67 that leads back to eluent tank 57. A suitable rinse water source is made to pass through the resin 15 to adjust its pH or other attribute & displace eluent fluid; the rinse outflow 67 along with any eluent material left within the volume occupied by the resin 15 then being returned to the eluent tank 57 for further use through eluent line 53 in the ELUTION block 51. Only enough rinse should be applied to sufficiently flush the resin 15, to avoid dilution of the eluent within eluent tank 57. In a practical continuous ion exchange operation a resin requires it be washed with 0.8-1.1 base volumes of rinse water to wash out the residual Eluent. If a 1N eluent is used and 1.25 liters of "new" 1N eluent is needed to stoichiometrically elute 1 liter of a resin of 1.25 gm_equivalents/liter capacity then it may be required to run enough rinse to provide this water to dilute a concentrated form of the Eluent. NaOH is usually available at 50% strength so it requires significant water to dilute it to 1N. This dilution in CIX comes via the Rinse step by "over rinsing" only enough to get the correct needed concentration throughout the ion exchange purification system 11. The same principles apply for acid sources when using a WAC resin. Thus the eluent feed line 59 may deliver a more concentrated strength of eluent in order for any dilution from the rinse water exit line 67 to be taken into account in the overall system balance.

As mentioned, since the rinse step involves displacing one liquid with another, the rinse volume may be necessarily small in order to avoid over dilution of the eluent in the eluent tank 57. After the rinse step is completed at RINSE block 61, the resin moves to the adsorption step represented by the ADSORPTION BLOCK 37. Any rinse water remaining in the resin 15 would simply be displaced by the adsorption feed line 33 and exit through the waste line 37. Alternatively, as mentioned above, the resin 15 usually enters a Conditioning step where an acid or base solution is applied to the resin to adjust its pH prior to the resin 15 re-entering the ADSORPTION block 35 and re-starting its cyclic path.

It is also clear from the above description, that a slightly different operation may be required or experienced during the start-up phase of operation of the ion exchange purification system 11. Details of start up of this process the eluent from the eluent tank 57 will displace all the loaded ions, both target ions and non-target ions into the PRE-ELUENT & PRODUCT tank 45. If the impure solution including both target ions and non-target ions are used during the start-up phase, with all the product solution impure ions used to pre-elute the incoming resin 15, such a pre-elution solution will still cause the target ion species (being the most selectively adsorbed) to begin to gradually displace the undesired (less selectively loaded) species until eventually the resin 15 arriving at the ELUTION block 35 will become essentially only loaded with the target species. Once the ELUTION block 35 will become essentially only loaded with the target species, the eluate flowing through exit line 55 will be pure target ion metal species and product can be withdrawn in quantities that represent the rate of target ion species input into the adsorption zone through the adsorption feed line 33. In the alternative, a supply of dissolved target ions can be added to the PRE-ELUENT & PRODUCT tank 45 at startup so that sufficient target ion will be able for the pre-elution step at the very outset. This will eliminate the recycle of non-target ions flowing through the ion exchange purification system 11 and enable the process to start with no inefficiencies. In either case the ion exchange purification system 11 will achieve and keep a balance.

Figure 2:
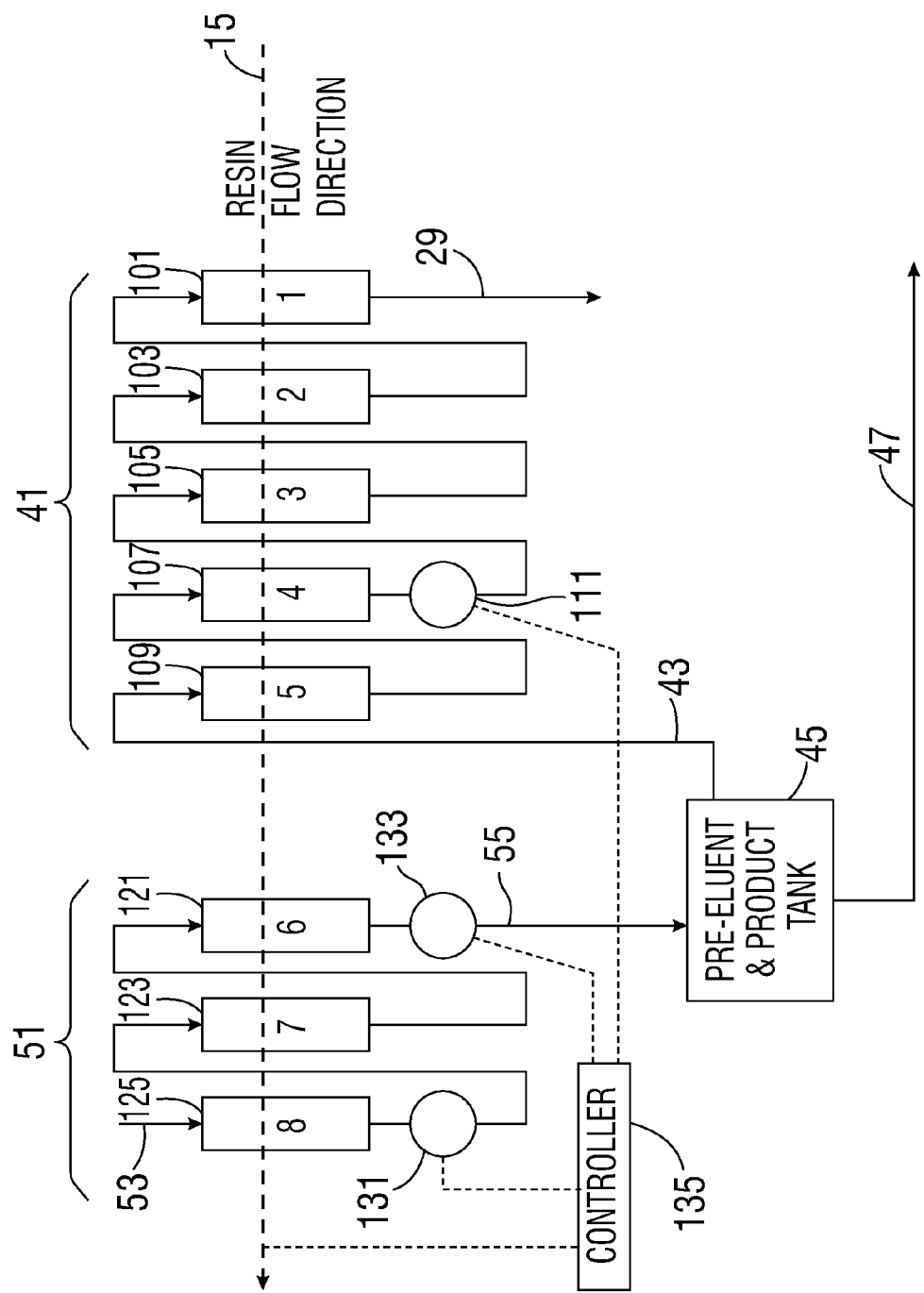

Referring to FIG. 2, a more detailed schematic arranged in terms of resin flow direction and focusing on the elution and pre-elution steps and the potential multiplicity of stages with a focus upon the input and output of the eluate product supply which also forms the product supply is shown. Beginning at the right side of FIG. 2, the resin 15 is shown as flowing to the left. A series of resin vessels or positions of resin vessels 101, 103, 105, 107, & 109 are shown connected in series and as forming the PRE-ELUTION block 41. The left most pre-eluent vessel is seen to have an input connection to the input line 43 from the PRE-ELUENT & PRODUCT tank 45 so that flow will proceed from input line 43, through vessels 109, 107, 105, 103, and 101 in that order. A sensor 111 is shown at the output of vessel 107 and upstream of vessel 105. The sensor 111 may preferably be a pH meter and it may be located anywhere between lines 43 and 29. In some instances placing the sensor 111 downstream of the second of five vessels 109, 107, 105, 103, and 101 may be helpful, but any number of sensors 111 can be place anywhere and between all vessels 109, 107, 105, 103, and 101.

Beginning at the left side of FIG. 2, the resin 15 continues to flow to the left. A series of resin vessels 121, 123, & 125 are own connected in series and shown as forming the ELUTION block 51. The left most vessel 125 is shown as having input line 53. A sensor 131 is shown between the output of resin vessel 125 and before the input of resin vessel 123. Sensor 131 may preferably be a conductivity sensor where the expected pH level might be expected to assume a sufficiently extreme level so as to show a significant conductivity difference between the value characteristic of pure eluent compared to the value of an equi-molar solution of the salt solution it forms and displaces. To show moment of the next position, the vessels 101, 103, 105, 107, 109, 121, 123, and 125 are numbered with increasing position numbers 1-8. In this manner the next and prior vessel position is known, as well as an understanding that the vessels 101 (position 1), 103 (position 2), 105 (position 3), 107 (position 4), 109 (position 5), 121 (position 6), 123 (position 7), and 125 (position 8) proceed in order through the PRE-ELUTION block 41 and into and through the ELUTION BLOCK 51.

A sensor 133 is seen in the output line 55 and downstream of the vessel 121 (position 6). Sensor 133 may preferably be a pH sensor. A controller 135 is seen connected to the sensors 131, 133, and 111. Controller 135 can be programmed to control the rate at which resin 15 proceeds along its dashed line path (indicated by the dashed line connection to the dashed line progression of the resin 15. In other embodiments the controller 135 can be made to control flow rates, temperature, blending, introduction of additives, and other aspects of the ion exchange purification system 11 invention.

General Considerations

One of the most efficient ways to execute this combination of operations for the ion exchange purification system 11 is to use a suitable ion exchange machine as described in the detailed description below. The preloading to equilibrium of either a weak base anion (WBA), or weak acid cation (WAC) resin 15 in contact with a solution of mixed ions will put the resin 15 in a form where a mixture of ions reside in the resin 15 phase. The removal or desorption (elution or regeneration) of these ions from a resin is stoichiometrically very efficient if either a strong base contacts the WBA resin or a strong acid contacts the WAC resin. If the eluates from these desorption steps are recycled into a pre-elution zone then the most selectively adsorbed ion in the initial adsorption (loading/equilibration) step will displace the less selectively loaded species and if this process is repeated, then, eventually the pre-eluted resin will become wholly or predominantly loaded only with the most selectively adsorbed species. In this manner, one can purify a single species from solution that is the most selectively adsorbed or a group of species that are more selectively adsorbed.

Optimization of the above process description can be aided by the use of a continuous ion exchange equipment system and a control configuration which is optimized to the particular resins 15 and their sensitivity to the target species to be recovered, the overall chemistry of the target species recovered, and the adjacency or co-sensitivity of the resin 15 for the next closest or adjacent non-target ion to be replaced on the resin 15 during the adsorption and pre-elution steps.

A continuous ion exchange system is an equipment technology as described in patents such as U.S. Pat. No. 7,191,797 by Jensen et al and entitled "ROTARY DISTRIBUTION APPARATUS" which is incorporated by reference herein. A multiple column system serviced by a single rotary distribution valve is a preferred device for implementing this invention. Other equipment implementations of the invention are possible.

To better illustrate the workings of the ion exchange purification system 11, a first example will be outlined and then explained in detail with reference to the drawings, followed by other examples presented in brief. In an Example 1, A PLS feed stream 21 containing 8 mg/L Re (Rhenium) in a strongly acidic sulfuric acid solution assaying 200 g/L as free acid is put in contact with a WBA resin which has good selectivity for perrhenate ion. The adsorption step of the process at ADSORPTION block 35 loads the resin 15 to a level approaching 20 g Re/L resin (as perrhenate) as the target ion species and the remainder of the resin capacity is mainly occupied by bisulfate ions (non-target ion species). Thus the non-target ion species as an impurity load occupies as much as 80% of the resin 15 adsorption sites while the target species may only load onto less than 20% of the resin ion exchange sites.

The challenge presented is to purify these resin 15 sites and cause them to be loaded with predominantly the target species. This is accomplished using a pure product solution of the target species that is produced in-situ (once steady state operation has been achieved) by a process called pre-elution, previously discussed. In the subsequent final elution by NaOH, which in this case may be used as an eluent, and it may be used in stoichiometric quantities to remove all ions from the resin 15 bed or volume or vessels 121 (position 6), 123 (position 7), or 125 (position 8). The resulting solution is then used in multiple applications to have the target perrhenate ions displace bisulfate ions on the resin 15 until the resin 15 is fully loaded with perrhenate.

This will allow a relatively pure perrhenate solution (140-170 g/L rhenium but with less than <2 g/L sulfate) to be is removed as product from the PRODUCT & PRE-ELUENT TANK 45. The ion exchange configuration used for the ion exchange purification system 11 used to do this in conjunction with the adsorption preferably has a number of steps and may have those steps executed simultaneously. Such scheme can be accomplished using the overall simplified schematic diagram shown and previously explained in FIG. 1. The following illustrates the reaction equations where R is the resin 15 active site for a WBA resin employed to capture, concentrate and purify rhenium in its perrhenate ionic form.

$$R.H\text{—}HSO_4 + ReO_4^- \rightarrow R.H\text{—}ReO_4 + HSO_4^- \quad \text{ADSORPTION}$$

$$R.H\text{—}HSO_4 + NaReO_4 \rightarrow R.H\text{—}ReO_4 + NaHSO_4 \quad \text{PRE-ELUTION}$$

$$R.H\text{—}ReO_4 + NaOH \rightarrow R. + NaReO_4 + H_2O \quad \text{ELUTION}$$

In FIG. 1, and considering the process of the ion exchange purification system 11 commencing with the ADSORPTION zone represented by ADSORPTION BLOCK 35, it is preferable to have a fully regenerated WAC or WBA resin 15 which has been first re-conditioned either in a special acid or base conditioning zone or conditioned by the adsorption barren stream itself, stream 37, to put it in condition for adsorption. Then as the resin 15 undergoes adsorption as represented by the ADSORPTION block 35 the resin 15 equilibrates with the ions in the feed solution and ends up loading the resin 15 with a mixture of ions according to the resin 15 selectivity. Ions which are totally non-selective will pass through to the waste line 37. The target ion is the ion most selectively adsorbed given the environment of the PLS feed. Consequently the resin 15 enriches itself with the target ion to some extent. As a general example, a resin in contact a solution of 10 mg/L perrhennate in a solution of 200 g/L sulfuric acid will load to 20 g/L perrhennate which represents about 10% of the total resin 15 capacity (the capacity taken with respect to the resin 15 which is present at the adsorption step). The remainder of the resin 15 sites equilibrate with mainly sulfate and bisulfate and other non-target ions present in the PLS feed 21. If the resin 15 is now simply eluted with a base such as NaOH the resulting solution will not be pure enough in perrhenate to make a saleable target ion product.

Where a multi-column setup is used, and where columns are cycled out of the adsorption step the columns or vessels 121 (position 6), 123 (position 7), and 125 (position 8) can be considered as undergoing a pseudo continuous batch process. A continuous ion exchange device indexes its columns or other vessels such as vessels 121 (position 6), 123 (position 7), and 125 (position 8) at a process determined interval related to the rate at which the resin 15 equilibrates with the PLS feed to the adsorption zone. So in FIG. 2 at each step in the ELUTION BLOCK 51 section shown, the columns enter into positions one removed sequentially to the left.

The right side of FIG. 2, the vessels 109 (position 5), 107 (position 4), 105 (position 3), 103 (position 2) and 101 (position 1) make up the PRE-ELUTION block 41 and the continuous ion exchange device of the ion exchange purification system 11 then proceeds to move the profile in the columns or vessels 109 (position 5), 107 (position 4), 105 (position 3), 103 (position 2) and 101 (position 1) back towards the right by flowing solution through the columns or vessels 109 (position 5), 107 (position 4), 105 (position 3), 103 (position 2) and 101 (position 1) as shown; i.e., resin 15 has stepped from right to left so fluid now flows from left to right from input line 43 to re-establish the profile and even move it slightly right so that a net effluent can be established leaving the pre-elution zone through recycle line 29. In the Example 1, while this action occurs there is a transfer of perrhennate to the resin 15 in vessels 107 (position 4) and 109 (position 5) while sulfate is displaced into the liquid phase and moves towards the zone effluent from vessel 101 (position 1) and into the recycle line 29.

Referring again to FIG. 1, if this solution introduced at input line 43 is now subjected to a counter-current contact in PRE-ELUTION block 41 with a pure perrhennate solution the resin 15 will load perrhennate onto the sulfate/bisulfate/impurity sites and flush these species into the PRE-ELUTION effluent recycle line 29 leaving only perrhenate on the resin 15 and only perrhenate in the solution phase in vessels 109 & 107. To control the PRE-ELUTION a monitor 111, which is preferably a pH monitor, is used in between columns or vessels 107 (position 4) and 105 (position 3) to detect an acidic front which may preferably have a pH in the range of 1 to 2, as opposed to the perrhenate front which has a higher characteristic pH in the range of from 4 to 6. Flow through this zone is controlled by using the sensor 111 under pH control to detect the pH change take place during the flow interval between the columns or vessels 107 (position 4) and 105 (position 3).

In this illustration, the resin 15 by the time it reaches the elution process represented by ELUTION block 51, the resin 15 will be fully charged with perrhennate. In the ELUTION block 51, the resin is partially regenerated with NaOH by the time it leaves vessel 121 (position 6) and fully regenerated by the time it vessel 123 (position 7) for surety purposes. A stoichiometric amount of NaOH is used, and the ELUTION block 51 may be controlled by a sensor 131 operated as a conductivity control at the outlet of vessel 125 (position 8). The conductivity of a pure caustic solution is significantly higher than that of a sodium perrhennate solution and so when all perrhennate is flushed from vessel 125 (position 8) the conductivity will increase significantly to indicate that pure caustic is present signifying the end of the elution process. The appearance of pure caustic at sensor 131 also marks the end of step time which is the interval between resin column or vessel position changes which is an integral part of the continuous ion exchange system control system.

FIG. 2 shows that five vessels 101 (position 1), 103 (position 2), 105 (position 3), 107 (position 4), & 109 (position 5) are used for PRE-ELUTION while three tanks 121 (position 6), 123 (position 7) and 125 (position 8) are used for ELUTION, relating to the Example given. It is understood that the relative volumes of these resin vessels in each zone, the ratios of the total volume and thus the effective bed length used for the ELUTION and PRE-ELUTION steps will vary from process to process, as well as the number and type of sensors used to control switching between various vessels 101 (position 1), 103 (position 2), 105 (position 3), 107 (position 4), 109 (position 5), 121 (position 6), 123 (position 7) and 125 (position 8). In general, PRE-ELUTION might take more residence time as the non-target ion replacement reactions may likely occur more slowly than the final regeneration reaction where the target ion is efficiently removed from the resin phase in the ELUTION zone. Further, differences in the ratio of non-target ions to target ions may contribute to a determination of the volume number of vessels allocated to each zone and thus the effective bed length used for the ELUTION and PRE-ELUTION steps. Further, many other and many more sensors, such as sensor 111, 131, and 133 can be utilized not just with respect to the structures shown in FIG. 2, but in all of the structure represented in FIGS. 1.

Referring again to FIG. 2, a further control for the process is the use of a pH measurement on stream 55, the outlet of vessel 121 (position 6) of the ELUTION block 51. This sensor 133 is used to detect a sodium perrhennate solution of pH ranging from about 4 to about 9. The detected pH in the range from about 4 to about 9 implies little or no excess NaOH and no acidic sulfate species are present in stream 55.

In summary, as the resin columns travel from positions at vessel 101 (position 1) to vessel 125 (position 8) a controller such as controller 135 can be used to ensure that the sulfate-perrhenate front stays in the middle of the PRE-ELUTION block 41 by monitoring pH with the sensor 111 and adjusting flow in line 43 to maintain vessel 109 (position 5) in position until it is ready to be switched and re-connected to assume the position of vessel 121 (position 6) to start the elution process at ELUTION block 51. In, addition the NaOH-perrhennate front in the middle of the elution process at ELUTION block 51 is maintained by monitoring the conductivity between positions tanks 123 (position 7) and 125 (position 8) (also shown as being at positions 7&8) and the pH in stream 8. As this front drifts the addition of NaOH, through input line 53 will be used to, is appropriately adjust to correct the drift of this front.

To achieve a steady state condition from time zero, all Eluate is used for a period of time until the resin 15 and liquid fronts are established. Gradually this condition is arrived at as the internal perrhennate inventory is built up on the resin and in the fluids resident from positions 3 to 7 including vessels 105 (position 3), 107 (position 4), 109 (position 5), 121 (position 6) and 123 (position 7), and in the PRODUCT (Eluate) tank 45. Once this condition is obtained then product can be removed from the PRE-ELUENT & PRODUCT TANK 45 at a rate that corresponded to the mass of perrhenate adsorbed and transferred from the ADSORPTION block 35 to the PRE-ELUTION block 41.

In the case of perrhennate the downstream process includes the precipitation of the salt potassium perrhennate at low temperature <20° C.; then a re-dissolution of the potassium perrhennate at 90° C. and passage of this solution through a cation resin in the $NH_4$ or H form to produce either an $NH_4ReO_7$ or perrhennic acid ($HReO_7$) solution suitable for sale. Based upon the input parameters recited, wherein elution occurs with a 0.5 to 2N NaOH to generate a strong solution of sodium perrhenate assaying at least 90 g/L Re in a pH range of from about 3 to about 7.

Assuming the resin 15 is loaded ONLY with the target species and is then desorbed by a 1 Normal solution then the desorbing solution will be 1 Normal in the target ion provided there is no other source of dilution. In the case of rhenium the process being used employs a resin that can load up to 1.25 equivalents of a target ion or ions (the resin 15 may be a commercially available Purolite A170 or Purolite A172). If resin 15 is desorbed with 1N NaOH, a 1N rhenium solution as per-rhennate ($ReO_7^-$) which is expected to be 186 g/L. In practice the resin 15 during the elution with NaOH releases water which dilutes the target ion in the product solution to 150-160 g/L from this dilution.

It may be expected that if the caustic concentration is not controlled it may be expected to have rhenium concentrations ranging from <80 g/L to >200 g/L. This can only occur if the NaOH ionic strength is sufficiently high. The limiting factor for any of the target species will be the total ionic strength of the eluting solution.

As has been shown above, the ion exchange purification system 11 of the invention, even if the PLS FEED 21 was of low concentration, the resulting loaded resin 15 is still processable to produce a final high concentration product. In other words, the concentration of the PLS FEED 21 is not important to the purification of the present invention. The higher resin 15 loading we get in Adsorption step the more efficient is the usage of eluent per unit of target species recovered. The less the amount of strongly competing non-target species that co-load in adsorption step the shorter will be the residence time of the resin 15 in the Pre-Elution zone.

Other examples 2 and 3 will, without as much detail, demonstrate two additional configurations for the ion exchange purification system 11. Example 2 is a feed stream at PLS FEED block 21 containing <1000 g/L uranium in a carbonate leach liquor as the target ion species and which loads onto a WAC resin 15 in the hydrogen form and which co-loads with other non-target cations such as Na and Ca and Mg. The loaded resin is then regenerated (ELUTION) with a mineral acid such HCl to form the chlorides of the cations. The eluate is applied multiple times to further load the resin (PRE-ELUTION) so that the less strongly adsorbed cations are displaced by the more strongly adsorbed $UO_2$ cation. In using this technique multiple times it results in a resin 15 exiting PRE-ELUTION and entering ELUTION, essentially exclusively loaded only with the uranyl cation; Once this condition is achieved the eluate product solution is ready to be harvested at the ELUTION BLOCK 51. The WAC resin 15 continues to be eluted with the strong acid and a portion of the eluate is taken off as product while another portion is fed into the PRE-ELUTION block 41 to displace the undesired non-target ions that are less selectively held by the resin 15. The following illustrates the reaction:

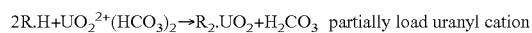

A whereby the cation of interest is the uranyl cation present in a carbonate/bicarbonate leachate of pH ranging 6-9 and is adsorbed onto a WAC resin, which resin is subsequently pre-eluted with uranyl chloride solution that is produced in the elution step employing 0.5 to 2.0 N acids selected from the group consisting of HCl, $HNO_3$ and $H_2SO_4$ and wherein the uranyl species on the final eluate is expected to reach levels of from about 40-250 g/L uranium.

In Example 3, the ion exchange purification system 11 tackles Chloride which is a problem in some acidic sulfate electrolytes. Chloride is more selectively loaded than bisulfate on to a WBA resin 15 since chloride is a stronger acid. Consequently, if such a resin 15 is equilibrated with a target solution, a larger amount of chloride will adsorb onto the resin than its solution fraction. Then in a pre-elution the chloride ion from the NaCl product at the PRE-ELUTION block 41, the chloride ion will displace bisulfate ion and slowly enrich the resin 15 phase in chloride ion to the point where essentially all the resin 15 sites are loaded with chloride ions. At this point the resin is regenerated with NaOH to produce a NaCl pure product. Much of this product may be continued to be used as a pre-eluent. In one example a feed stream of chloride ion assaying <200 mg/L in an acidic sulfate solution assaying >150 g/L free sulfuric acid, a product solution assaying >45 g/L chloride has been produced in the PRODUCT tank.

The reactions are as follows:

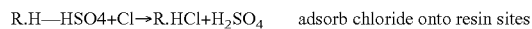

This process description is illustrative only and is not intended to limit the scope of the invention as defined by the appended claims. It will be apparent to those skilled in the art that various modifications and variations can be made in the methods of the present invention without departing from the spirit and scope of the invention. Thus, it is intended that the present invention cover modifications and variations of this invention provided they come within the scope of the appended claims and their equivalents.

What is claimed:

1. A process of purifying a target ionic species from a mixture of the target ionic species and an accompanying non-target anionic species comprising the steps of:
   providing a mixture of a target ionic species and a non-target ionic specie;
   providing a weakly ionic resin, that has prime loading selectively for the target ionic species and less loading selectivity for the non-target ionic specie;
   loading the weakly ionic resin with the mixture of the target ionic species and a non-target ionic specie;
   further loading the weakly ionic resin with the target ionic species to displace to almost complete exclusion of the less selectively loaded ionic species through displacement in a pre-elution step; and
   eluting the target anionic species by a stoichiometrically efficient elution harvesting using a chemical base to produce a pure stream of target ionic species having an almost completely excluded the less selectively loaded ionic specie.

2. The process as recited in claim 1 wherein the process occurs on a continuous ion exchange machine.

3. The process as recited in claim 1 and further including the step of subjecting the pure stream of the target ionic species to at least one of a metal and metal salt recovery operation.

4. The process as recited in claim 3 wherein the subjecting the substantially pure stream of the target ionic species to at least one of a metal and metal said recovery operation is accomplished by at least on of electrolysis, crystallization, chemical precipitation, and chemical reduction.

5. The process as recited in claim 1 wherein the target ionic species is at least one of rhenium, uranium, and chloride.

* * * * *